(12) United States Patent
Lin et al.

(10) Patent No.: US 9,985,838 B2
(45) Date of Patent: May 29, 2018

(54) MASS MAC WITHDRAWAL FOR EVPN-DCI USING VIRTUAL ESI

(71) Applicant: Juniper Networks, Inc., Sunnyvale, CA (US)

(72) Inventors: Wen Lin, Andover, MA (US); John E. Drake, Pittsburgh, PA (US); Sunil Kumar Malali, Bangalore (IN); Kapil Arora, Bangalore (IN); Vikram Nagarajan, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 200 days.

(21) Appl. No.: 15/083,732

(22) Filed: Mar. 29, 2016

(65) Prior Publication Data

US 2017/0288970 A1 Oct. 5, 2017

(51) Int. Cl.
| | | |
|---|---|---|
| H04L 12/24 | (2006.01) | |
| H04L 29/12 | (2006.01) | |
| H04L 12/46 | (2006.01) | |
| H04L 12/715 | (2013.01) | |
| H04L 12/721 | (2013.01) | |
| H04L 12/751 | (2013.01) | |
| H04L 12/741 | (2013.01) | |

(52) U.S. Cl.
CPC .............. *H04L 41/12* (2013.01); *H04L 12/46* (2013.01); *H04L 12/4625* (2013.01); *H04L 45/02* (2013.01); *H04L 45/54* (2013.01); *H04L 45/64* (2013.01); *H04L 45/66* (2013.01); *H04L 61/2084* (2013.01); *H04L 61/6022* (2013.01); *H04L 61/6004* (2013.01)

(58) Field of Classification Search
CPC ...................................................... H04L 41/12
See application file for complete search history.

(56) References Cited

U.S. PATENT DOCUMENTS 9,735,983 B1 * 8/2017 Sharma ............... H04L 12/4675
9,781,032 B1 * 10/2017 Shukla .................... H04L 45/66
(Continued)

OTHER PUBLICATIONS

Sajassi et al., "BGP MPLS-Based Ethernet VPN," RFC 7432, Internet Engineering Task Force, IETF, Feb. 18, 2015, 56 pp.
(Continued)

*Primary Examiner* — Andrew Lai
*Assistant Examiner* — Andrew C Lee
(74) *Attorney, Agent, or Firm* — Shumaker & Sieffert, P.A.

(57) ABSTRACT

The techniques described are directed to providing mass withdrawal of media access control (MAC) routes for network devices in an Ethernet virtual private network data center interconnect (EVPN DCI). MAC routes to reach the learned MAC addresses are stored in routing tables with corresponding top-of-rack Ethernet segment identifier (TOR-ESI) values that represent the Ethernet segments from where the MAC addresses were learned. A provider edge (PE) network device may configure and advertise a virtual Ethernet segment identifier (vESI) that includes a plurality of TOR-ESI values. As Ethernet segments of the data center become unavailable, the corresponding TOR-ESI values may be withdrawn from the vESI to form an updated vESI. In this way, MAC routes having a TOR-ESI value that was withdrawn from the vESI may be removed from the routing tables in each of the network devices.

18 Claims, 4 Drawing Sheets

(56) References Cited

U.S. PATENT DOCUMENTS

| | | | |
|---|---|---|---|
| 9,838,310 B1* | 12/2017 | Sajassi | H04L 45/66 |
| 9,858,150 B2* | 1/2018 | Sajassi | G06F 11/1423 |
| 9,860,150 B2* | 1/2018 | Singh | H04L 43/10 |
| 2009/0304002 A1* | 12/2009 | Yu | H04L 49/30 370/395.3 |
| 2009/0304022 A1* | 12/2009 | Yang | H04L 49/90 370/463 |
| 2011/0286452 A1* | 11/2011 | Balus | H04L 12/4641 370/390 |
| 2013/0308646 A1* | 11/2013 | Sajassi | H04L 45/66 370/395.53 |
| 2016/0261487 A1* | 9/2016 | Singh | H04L 12/4641 |
| 2016/0285760 A1* | 9/2016 | Dong | H04L 12/4666 |
| 2017/0141998 A1* | 5/2017 | Singh | H04L 45/16 |

OTHER PUBLICATIONS

Sajassi et al., "A Network Virtualization Overlay Solution using EVPN, draft-ietf-bess-evpn-overlay-02," Internet-Draft, L2VPN Workgroup, Oct. 19, 2015, 27 pp.

Rabadan et al., "Interconnect Solution for EVPN Overlay networks, draft-ietf-bess-dci-evpn-overlay-02," Internet Draft, BESS Workgroup, Feb. 29, 2016, 23 pp.

Extended Search Report from counterpart European Application No. 17163655.8, dated Aug. 30, 2017, 10 pp.

Boutros et al., "VXLAN DCI Using EVPN," Internet Draft, draft-boutros-l2vpn-vxlan-evpn-04.txt, Jul. 2, 2014, 14 pp.

Sajassi et al., "EVPN Virtual Ethernet Segment," Internet Working Group Internet Draft, draft-sajassi-bess-evpn-virtual-eth-segment-01, Jul. 6, 2015, 22 pp.

Rabadan et al., "Data Center Interconnect Solution for EVPN Overlay networks," L2VPN Workgroup Internet Draft, draft-rabadan-l2vpn-dci-evpn-overlay-01.txt, Feb. 14, 2014, 20 pp.

Response filed Apr. 4, 2018 to the Extended Search Report from counterpart European Application No. 17163655.8, dated Aug. 30, 2017, 23 pp.

\* cited by examiner

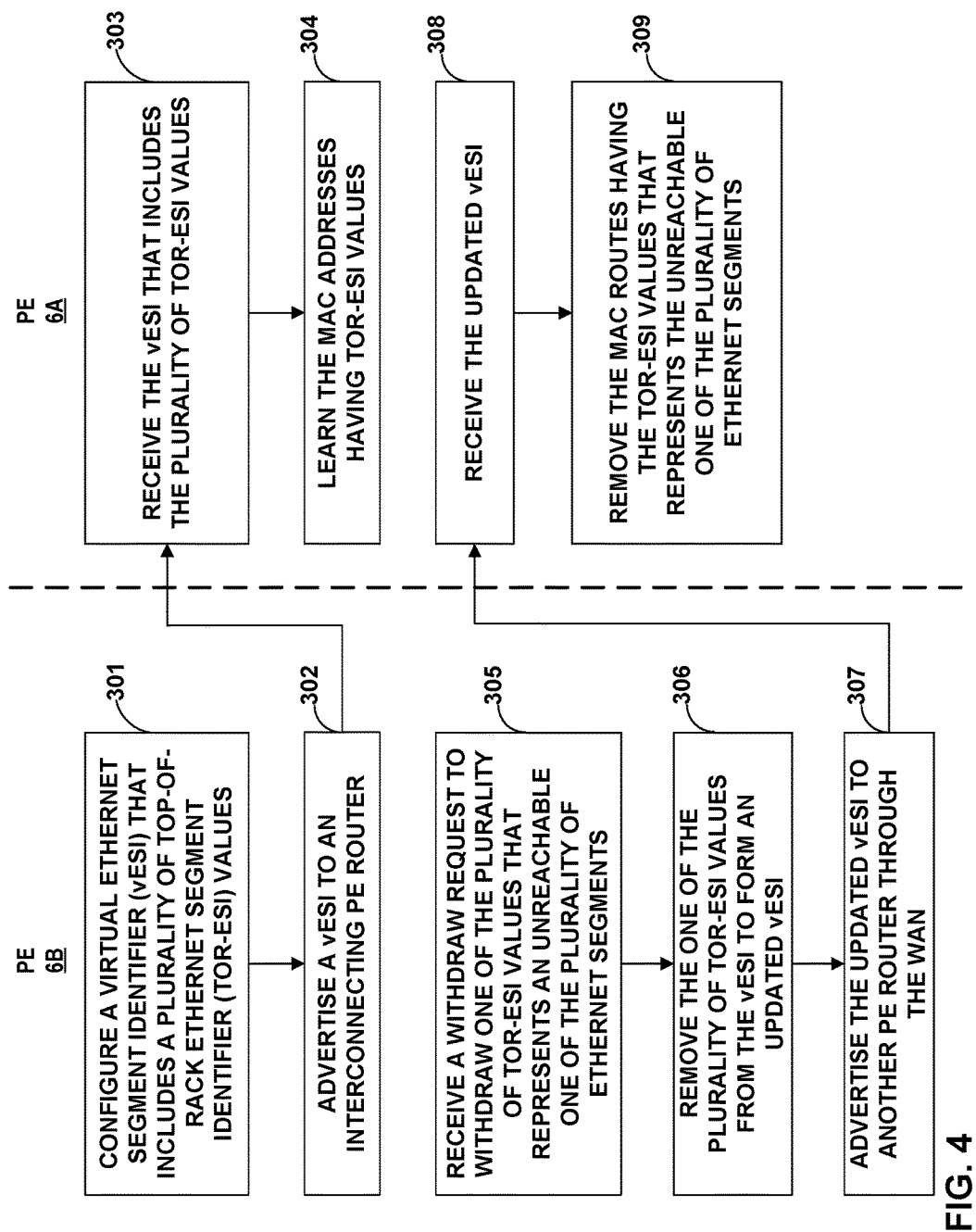

MASS MAC WITHDRAWAL FOR EVPN-DCI USING VIRTUAL ESI

TECHNICAL FIELD

The disclosure relates to computer networks and, more particularly, to routing packets within computer networks.

BACKGROUND

A data center is a specialized facility that provides data serving and backup as well as other network-based services for subscribers and other entities. A data center in its most simple form may consist of a single facility that hosts all of the infrastructure equipment, such as networking and storage systems, servers, redundant power supplies, and environmental controls.

More sophisticated data centers may be provisioned for geographically dispersed organizations using subscriber support equipment located in various physical hosting facilities (sites). As a result, techniques have been developed to interconnect two or more physical data centers to form a single, logical data center. One example interconnect is an Ethernet virtual private network (EVPN) data center interconnect (DCI) through an intermediate network coupling multiple physical data centers.

An EVPN DCI is often used to extend two or more remote layer two (L2) customer networks of geographically separate data centers through an intermediate layer three (L3) network in a transparent manner, i.e., as if the intermediate L3 network does not exist. The EVPN DCI transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the data centers.

A data center may be connected to the intermediate EVPN by an Ethernet segment provided by one or more PE network devices. That is, the one or more PE network devices are coupled to the data center by access links that logically operate as an Ethernet segment and, therefore, provide connectivity to the EVPN for one or more customer networks within the local data center.

SUMMARY

The techniques described herein are directed to providing mass withdrawal of media access control (MAC) routes for network devices in an Ethernet virtual private network data center interconnect (EVPN DCI). MAC addresses are typically learned by each of the different network devices in a network system, such as top-of-rack (TOR) switches of a data center and provider edge (PE) network devices of a wide area network (WAN). MAC routes to reach the learned MAC addresses are stored in routing tables with corresponding top-of-rack Ethernet segment identifier (TOR-ESI) values that represent the Ethernet segments from where the MAC addresses were learned.

As described herein, a PE network device may configure and advertise a virtual Ethernet segment identifier (vESI) that includes a plurality of TOR-ESI values to enable mass MAC route withdrawal at each of the network devices based on the withdrawal of the corresponding TOR-ESI value. In particular, as Ethernet segments of the data center become unavailable, the corresponding TOR-ESI values may be withdrawn from the vESI to form an updated vESI. In this way, MAC routes having a TOR-ESI value that was withdrawn from the vESI may be removed from the routing tables in each of the network devices. PE network devices may further advertise the updated vESI to inform interconnected PE network devices within the WAN and TOR switches of the data centers to remove the corresponding MAC routes having the TOR-ESI value that was withdrawn from the vESI. In this way, MAC routes having the TOR-ESI value may be massively withdrawn from routing tables of all network devices in an EVPN DCI.

In one example, a method includes configuring, by a PE network device that implements an EVPN DCI, a vESI that comprises a plurality of TOR-ESI values that represent a plurality of Ethernet segments coupled to a TOR switch, wherein each of the plurality of Ethernet segments comprises one or more MAC addresses associated with a respective one of the plurality of Ethernet segments. The method also includes advertising, by the PE network device and to another PE network device in the EVPN DCI, the vESI that comprises the plurality of TOR-ESI values. The method further includes receiving, by the PE network device and from the TOR switch, a withdraw request to withdraw one of the plurality of TOR-ESI values that represents an unreachable one of the plurality of Ethernet segments coupled to the TOR switch. The method also includes removing, by the PE network device, the one of the plurality of TOR-ESI values from the vESI to form an updated vESI, wherein deleting the one of the plurality of TOR-ESI values from the vESI further comprises removing MAC routes having the one of the plurality of TOR-ESI values that represents the unreachable one of the plurality of Ethernet segments coupled to the TOR switch.

In another example, a method includes receiving, by a PE network device and from another PE network device in an EVPN DCI, a vESI that comprises a plurality of TOR-ESI values that represent a plurality of Ethernet segments coupled to a TOR switch that is coupled to the another PE network device, wherein each of the plurality of Ethernet segments comprises one or more MAC addresses associated with a respective one of the plurality of Ethernet segments. The method also includes learning, by the PE network device, the one or more MAC addresses associated with each of the plurality of Ethernet segments, wherein the one or more MAC addresses are advertised with one of the plurality of TOR-ESI values that represents the respective one of the plurality of Ethernet segments. The method further includes receiving, by the PE network device and from the another PE network device, an updated vESI, wherein an unreachable one of the plurality of Ethernet segments coupled to the TOR switch is absent from the updated vESI. The method also includes removing, by the PE network device, MAC routes having the one of the plurality of TOR-ESI values that represents the unreachable one of the plurality of Ethernet segments based on the updated vESI.

In another example, a PE network device includes a control unit having at least one processor coupled to memory, wherein the control unit executes software configured to establish an EVPN DCI. The PE network device also includes an interface that connects the PE network device to a TOR switch. The PE network device also includes a routing engine configured to: configure a vESI that comprises a plurality of TOR-ESI values that represent a plurality of Ethernet segments coupled to the TOR switch, wherein each of the plurality of Ethernet segments comprises one or more MAC addresses associated with a respective one of the plurality of Ethernet segments; advertise the vESI that comprises the plurality of TOR-ESI values to another PE network device in the EVPN DCI; receive a withdraw request from the TOR switch to withdraw one of the plurality of TOR-ESI values that represents an unreachable one of the plurality of Ethernet segments coupled to the TOR switch; and remove the one of the plurality of TOR-ESI values from the vESI to form an updated vESI, wherein the routing engine is configured to remove MAC routes having the one of the plurality of TOR-ESI values that represents the unreachable one of the plurality of Ethernet segments coupled to the TOR switch.

In another example, a PE network device includes a control unit having at least one processor coupled to memory, wherein the control unit executes software configured to establish an EVPN DCI. The PE network device also includes an interface that connects the PE network device to another PE network device in the EVPN DCI. The PE network device also includes a routing engine configured to: receive a virtual Ethernet segment identifier (vESI) from the another PE network device in the EVPN DCI, the vESI comprising a plurality of TOR-ESI values that represent a plurality of Ethernet segments coupled to a TOR switch that is coupled to the another PE network device, wherein each of the plurality of Ethernet segments comprises one or more MAC addresses associated with a respective one of the plurality of Ethernet segments; learn the one or more MAC addresses associated with each of the plurality of Ethernet segments, wherein the one or more MAC addresses are advertised with one of the plurality of TOR-ESI values that represents the respective one of the plurality of Ethernet segments; receive an updated vESI from the another PE device, wherein an unreachable one of the plurality of Ethernet segments coupled to the TOR switch is absent from the updated vESI; and remove MAC routes having the one of the plurality of TOR-ESI values that represents the unreachable one of the plurality of Ethernet segments based on the updated vESI.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a flowchart illustrating example operations of network devices to provide mass MAC route withdrawal for an EVPN DCI by utilizing vESIs, in accordance with techniques of the disclosure.

DETAILED DESCRIPTION

Figure 1:
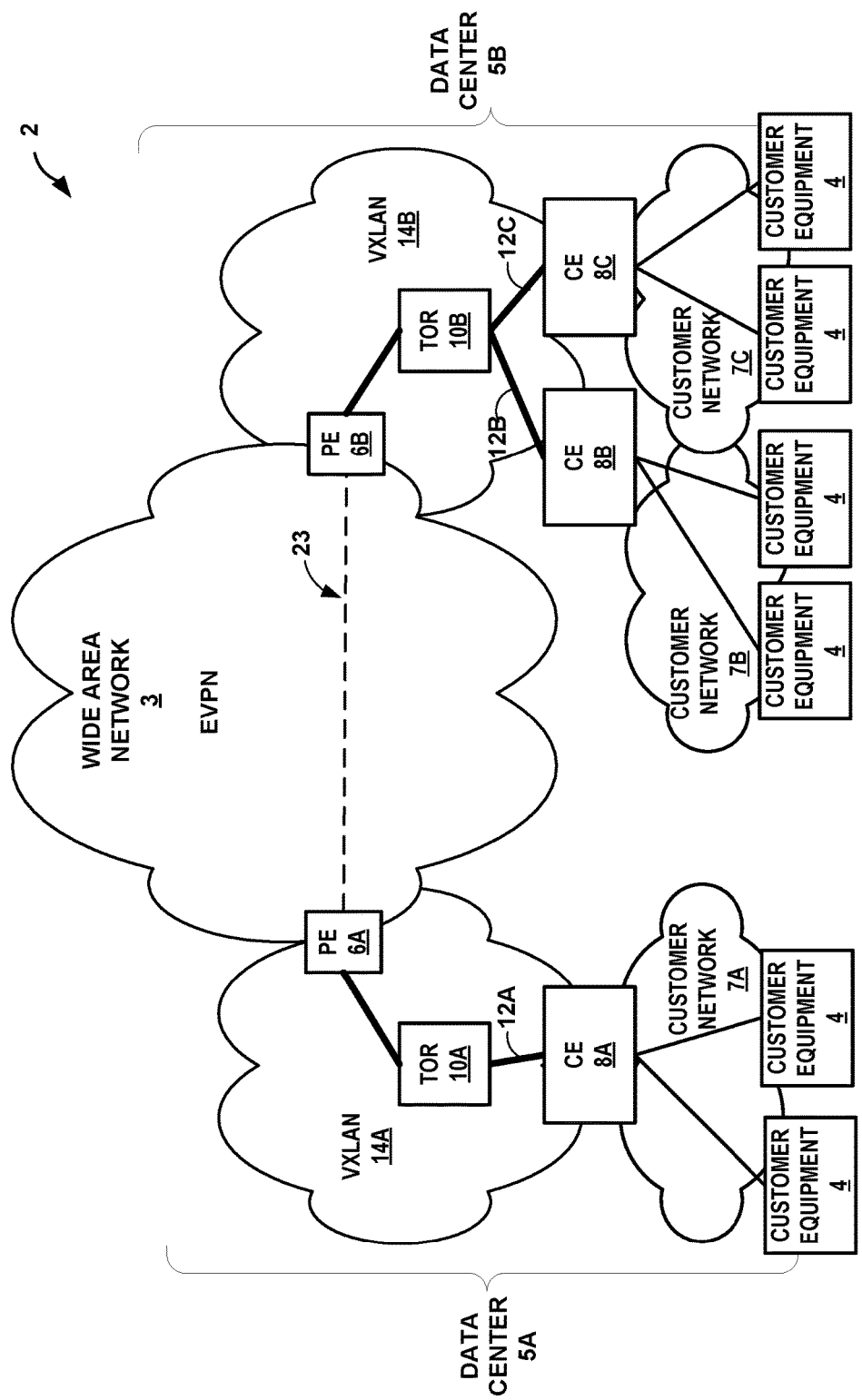
FIG. 1 is a block diagram illustrating an example system in which network devices provide mass MAC route withdrawal for an Ethernet virtual private network data center interconnect (EVPN DCI) between data centers by utilizing virtual Ethernet segment identifiers (vESIs), whose values map to Top-of-Rack Ethernet segment identifiers (TOR-ESIs) learned from a data center.

FIG. 1 is a block diagram illustrating an example network system 2 in which network devices provide mass MAC route withdrawal for an Ethernet virtual private network data center interconnect (EVPN DCI) by utilizing virtual Ethernet segment identifiers (vESIs). For example, the network devices, such as routers, advertise an aggregation of top-of-rack Ethernet segment identifier (TOR-ESI) values learned in a data center as a vESI, which map to Ethernet segment identifiers (ESIs) that are in a data center. In this way, when a failure occurs along one of the ESIs, the network devices may remove the TOR-ESI from the vESI and re-advertise the vESI without the corresponding TOR-ESI value. This way, network devices may conduct mass MAC route withdrawal across the EVPN domains by withdrawing all MAC routes associated with the withdrawn TOR-ESI value.

In the example of FIG. 1, data centers 5A-5B (collectively, "data centers 5") are networks having specialized facilities that provide storage, management, and dissemination of data to subscribers and other entities. Example data centers 5A, 5B include a plurality of physical and/or logical customer networks having customer equipment, such as customer networks 7A-7C (collectively, "customer networks 7") having customer equipment 4 that provide computing environments for subscribers/customers. Customer equipment 4 may connect to data centers 5 to request and receive services and data provided by data centers 5. In some instances, data centers 5A, 5B are geographically dispersed facilities, or "sites," of an overall data center to provide geographical redundancy against localized failure of one of the data centers.

In the example of FIG. 1, data centers 5 are interconnected by a wide area network (WAN) 3. In general, WAN 3 represents a layer three (L3) network and may include multiple intermediate routing and switching devices (not shown) that transport data traffic over links between data centers 5. For example, wide area network 3 may implement Multiprotocol Label Switching (MPLS) techniques and may be referred to as an MPLS/IP network. While described as a wide area network, the MPLS/IP network may represent any network capable of transmitting traffic exchanged between provider edge network devices 6A-6B (collectively, "PEs 6"). PEs 6 provide virtual layer 2 (L2) bridged connectivity between the customer edge network devices 8A-8C (collectively, "CEs 8"). CEs 8 may be a host, a router, or a switch connected to the PEs 6 that form the edge of the MPLS infrastructure.

PEs 6A, 6B may utilize Ethernet virtual private network technology (EVPN) through WAN 3 to provide an EVPN data center interconnect (EVPN DCI) 23 between data centers 5A and 5B. A data center interconnect is the networking of two or more data centers, such as data centers 5. Data centers 5 are interconnected through EVPN, which is a service that provides a form of L2 connectivity across an intermediate network, such as WAN 3, to interconnect two L2 customer networks, such as L2 customer networks 7, that are usually located in two different geographic areas. Often, EVPN is transparent to the customer networks in that these customer networks are not aware of the intervening intermediate network, i.e., WAN 3, and instead act and operate as if these two customer networks were directly connected. In this way, PEs 6 provide an EVPN DCI 23 to transport L2 communications for customer networks 7 of data centers 5 through an intermediate network (WAN 3), in a transparent manner, i.e., as if the intermediate network does not exist and data centers 5 were instead directly connected.

In particular, each of PEs 6 provide the EVPN DCI 23 to transport L2 communications, such as Ethernet packets or "frames," through WAN 3 for one or more customer networks 7 of data centers 5. PEs 6 may provide IP/GRE tunneling or other IP tunneling between PEs 6. To configure an EVPN DCI, a network operator of the service provider configures various devices included within the network that interface with L2 customer networks 7. The EVPN DCI configuration may include an EVPN instance (EVI), which includes one or more broadcast domains. Generally, an EVI may refer to a routing and forwarding instance on a PE network device. Consequently, multiple EVIs may be configured for Ethernet segments 12A-12C (collectively, "ES 12"), as further described herein, each providing a separate, logical layer two (L2) forwarding domain. In this way, multiple EVIs may be configured that each includes one or more PEs 6 of Ethernet segments 12.

Customer equipment 4 of different customer networks 7 provided within each of data centers 5 may be virtually isolated onto different Virtual Extensible LANs 14A-14B (collectively, "VXLANs 14"). VXLANs 14 provide a layer 2 overlay scheme on a layer 3 network. A VXLAN Network Identifier (VNI) identifies each VXLAN segment. The VNI identifies the scope of the inner MAC frame originated by the customer equipment 4. Each of data centers 5 includes an underlay network of transport routers that transport L2 communications for customer networks 7 through respective VXLANs 14 for that customer. As such, PEs 6 may receive customer traffic from local VXLANs 14 and act as a switching media interface (SMI) to forward the traffic through WAN 3 via the EVPN DCI 23. Similarly, PEs 6 may receive L2 communications from EVPN DCI 23 and act as a switching media interface (SMI) to forward the L2 communications via VXLANs 14 for transport through the local data centers 5 via the respective underlay networks.

In the example of FIG. 1, each VXLAN 14 includes one or more customer edge network devices 8A-8C (collectively, "CEs 8") that connect the data center end, such as VXLANs 14, to customer equipment 4. Customer equipment 4 of customer network 7A are coupled to VXLAN 14A by CE device 8A. Customer equipment 4 of customer networks 7B, 7C are coupled to VXLAN 14B by CE device 8B and 8C, respectively.

In the example of FIG. 1, each of customer networks 7 is coupled to VXLANs 14 by respective Ethernet segments 12A-12C (collectively, "ES 12") such that PEs 6A and 6B operate to provide L2 connectivity to CEs 8. Ethernet segments have an identifier, called the Ethernet segment identifier (ESI). In general, an Ethernet segment uses a non-reserved ESI that is unique network wide (e.g., across all EVPN DCIs on all the PEs). In some examples, a network operator may manage ESIs throughout the EVPN DCI to ensure unique network wide ESIs for respective Ethernet segments. In particular, Ethernet segment 12A provides connectivity to CE 8A of data center 5A. Likewise, Ethernet segment 12B and 12C provide connectivity to CE 8B and 8C, respectively, of data center 5B.

PE network devices may include one or more EVPN instances (EVIs) that each represents a different virtual layer two network with separate forwarding domains. For example, PE 6B may include a WAN EVI facing WAN 3 and a VXLAN EVI facing data center 5B. PE network devices may share learned MAC addresses for a particular EVI by sending MAC Advertisement routes that specify, among other information, a learned MAC address and a corresponding ESI. In this way, PEs may maintain tables of MAC addresses associated with corresponding ESIs. Consequently, a PE network device that receives and maintains MAC addresses that were previously learned by other PE network devices can determine that a MAC route is accessible through multiple PE network devices that are associated with the same ESI.

Data centers may include top-of-rack (TOR) switches 10A-10B (collectively, "TOR switches 10") coupled to CEs 8. TOR switches 10 provide customer networks 7 with connectivity to WAN 3. TOR switches 10A and 10B may be network devices that provide layer 2 (MAC address) and/or layer 3 (IP address) routing and/or switching functionality. In one example, TOR switch 10B may aggregate data center 5B traffic from customer equipment 4, connected to CEs 8B and 8C, to PE 6B that communicates with WAN 3 and/or other data centers, such as data center 5A. TOR switch 10B may receive Internet Protocol (IP) packets from customer equipment 4 connected to CEs 8B and 8C through its network interface, read the packets' destination IP address, look up these addresses on its routing table to determine the corresponding destination component, and forwards the packets according to the result of the lookup.

PEs 6 provide an EVPN/VXLAN data center interconnect (DCI) between data centers 5. As such, each of PEs 6 operates as a gateway between EVPN DCI 23 and VXLANs 14, and may function as VXLAN Tunnel Endpoints ("VTEPs") with respect to VXLANs 14. That is, each PE 6 may include logically separate routing instances for VXLAN 14 and EVPN DCI 23 and each operates to bridge traffic between the two distinct internal routing instances. Further example structural and functional details of the EVPN/VXLAN DCI implemented by PE routers 6 are described in "VXLAN DCI Using EVPN," draft-boutros-12vpn-vxlan-evpn-04.txt, Internet Engineering Task Force (IETF), Jul. 2, 2014, the entire contents of which are incorporated herein by reference.

Customer equipment 4 have physical addresses, also called media access control (MAC) addresses that uniquely identify network devices on the same network subnet. In a conventional network system, a TOR switch forwards layer 2 packets (as broadcast, unknown unicast, and multicast (BUM) traffic) from source MACs toward destination MACs. The source MAC addresses are learned over the data plane on the data center end (e.g., EVPN VXLAN side). These source MAC addresses are installed in a border gateway protocol (BGP) table in the EVPN VXLAN instance as a BGP Type-2 route, which are then sent across the VXLAN network to the PE network device over BGP. A Type-2 route is a MAC/IP advertisement route, which enables advertisement of MAC address reachability, and/or advertisement of IP/MAC bindings. The TOR switch may also forward the packets on the IP tunnel on the VXLAN network towards a PE network device.

The PE network device typically installs the Type-2 route on its EVPN VXLAN instance. The PE network device, on the EVPN VXLAN instance, receives the BUM traffic and forwards the BUM traffic over the SMI. On the PE network device, on the EVPN MPLS instance, the BUM traffic received over the SMI are examined and the source MAC addresses are learned and installed as BGP Type-2 route in a EVPN MPLS table. The PE network device then forwards the BGP Type-2 route across the MPLS network to an upstream BGP PE network device and forwards the packet over the MPLS IP tunnel towards the upstream BGP PE network device.

On the upstream PE network device, the BGP Type-2 route for the source MAC address is typically installed in a MPLS instance from a BGP route advertisement. The upstream PE network device also receives the BUM traffic received over the MPLS IP tunnel and forwards the packets onto the interface between the upstream EVPN and the upstream VXLAN. On the upstream PE network device, on the EVPN VXLAN instance, the BUM traffic received over the SMI are examined and the source MAC address is learned and installed in the EVPN VXLAN table as BGP Type-2 routes. This BGP Type-2 route is then sent across the VXLAN network to the upstream BGP TOR switch. The upstream PE network device also forwards the packets over the VXLAN IP tunnel towards the upstream BGP TOR switch. On the upstream BGP TOR switch, the BGP Type-2 route is received over the VXLAN installed in the EVPN VXLAN table. The upstream BGP TOR switch also receives the IP packets and forwards the packets onto the interface for the upstream data center end.

As such, a source MAC address is typically learned across the different routers (TORs and interconnecting PE network devices) using a combination of data plane learning over a data center end (VXLAN), BGP Type-2 route advertisement, and data plane learning over a Switching Media Interface (interface between EVPN and VXLAN). However, implementing mass MAC address withdrawal in a network system that utilizes the above MAC address learning techniques requires high CPU cycles and results in delayed MAC address deletion. For example, in a conventional network system, when failure occurs on one of the Ethernet segments connected to a TOR switch, the MAC addresses behind the failed ESI link become unreachable. When the TOR switch detects the ESI link is down, the TOR switch withdraws the route associated with the failed ESI link by sending Type-1 route delete for the failed ESI link. A Type-1 route delete removes the advertised ESIs. The withdrawal also causes the PE router to delete all the MAC routes associated with the failed ESI link.

In this conventional system, because the PE network device learned the MAC addresses on the EVPN MPLS side using data plane learning, Type-1 route deletion of MAC addresses learned on the EVPN MPLS side require learned MAC addresses to "age-out." For example, learned MAC addresses are installed with a MAC-age (e.g., ten minutes), which is a duration that MAC route entries will remain on the EVPN MPLS instance of the PE router as long as traffic from these MAC addresses are received within the specified duration. In the event of a failed ESI link, since traffic from these MAC addresses will no longer reach over this SMI, the MAC routes stored in the PE router will "age-out" and are withdrawn from the PE network device. The withdrawal of the learned BGP Type-2 MAC routes from the WAN EVI occurs one route at a time, which consumes time and CPU cycles for the deletion of a vast amount (e.g., a million MAC addresses anchored on the failed ESI) of MAC addresses. In other words, there is no mass MAC route withdrawal because the ESI of the SMI is still operational.

On the upstream PE network device, on the MPLS EVI, these BGP Type-2 route withdrawals are used to delete the MAC route entries on the upstream PE network device MPLS EVI side, thereby causing the deletion of MAC route entries on the upstream PE network device to also age-out because they were learned over the data plane on the SMI. The upstream PE network device, on the VXLAN EVI, therefore withdraws the BGP Type-2 routes towards the upstream TOR switch one route at a time. As such, there is no mass MAC route withdrawal on the upstream PE network device and upstream TOR switch because the ESI of the SMI (e.g., upstream PE network device) is still operational. The above conventional withdrawal techniques may also cause MAC routes to linger in the table (with a limit on the number of MAC routes allowed) for a longer period of time, which may prevent newer reachable MAC routes to be installed in place of the unreachable MAC routes.

Even in an alternative system where MAC addresses are associated with an Interconnect ESI (I-ESI), which represents a grouping of interconnecting links between the network and the data center, mass MAC withdrawal from upstream PE network devices are still withdrawn one route at a time. For example, even if MACs are not learned over the SMI interface as described above, but learned by the exporting of Type-2 MAC routes between the EVPN instances, BGP Type-2 routes on the VXLAN EVI and MPLS EVI are still withdrawn one MAC route at a time. Additionally, if one of the ESIs in the I-ESI becomes unreachable, the TOR switch may send a MAC mass withdrawal to the connected PE router for the unreachable ESI. This is fine for the VXLAN EVI, but to withdraw the unreachable ESI in an upstream PE network device, the PE network device must either withdraw the I-ESI, thereby withdrawing the other ESIs that are reachable, or withdraw the learned BGP Type-2 MAC routes from the EVI one route at a time as stated above.

In accordance with the techniques of the disclosure, virtual Ethernet segment identifiers (vESIs) anchored in Interconnecting Ethernet segment identifiers (I-ESIs) are advertised to interconnecting PE network devices so that a PE network device may quickly withdraw unreachable MAC routes pertaining to a particular TOR-ESI value within the vESI. In the example of FIG. 1, each of the interconnecting PE network devices, such as PE 6B, advertise vESI segments anchored on I-ESIs, which represent the interconnecting links between WAN 3 and data center 5. In particular, the vESI refers to an association of a virtual Ethernet segment and TOR-ESIs for Ethernet segments 12B and 12C connected to TOR 10B.

Further examples of vESIs are described in "EVPN Virtual Ethernet Segment," draft-sajassi-bess-evpn-virtual-eth-segment-01, Internet Engineering Task Force (IETF), Jul. 6, 2015, the entire contents of which are incorporated herein by reference.

When MAC addresses are learned on the data center end, the MAC addresses are associated with TOR-ESIs. PE 6B may utilize BGP to advertise the vESI containing an aggregation of the TOR-ESIs that are in the data center. In this way, the MAC addresses learned behind an Ethernet segment are advertised with the TOR-ESI values corresponding to that Ethernet segment, instead of propagating BGP Type 2 routes for adding and withdrawing MAC routes across WAN EVI.

In the example of FIG. 1, PE 6B may configure a vESI anchored on the I-ESI at PE 6B to include TOR-ESI values that map to TOR Ethernet segments, e.g., Ethernet segments (ES) 12B and 12C connected to TOR 10B. In particular, the MAC addresses learned from each of Ethernet segments 12B and 12C are advertised with respective TOR-ESI values. For example, a TOR-ESI value may represent ES 12B and its connection to customer equipment 4 of customer network 7B. Similarly, another TOR-ESI value may represent ES 12C and its connection to customer equipment 4 of customer network 7C. PE 6B may advertise the aggregation of respective TOR-ESI values (e.g., ES 10B and 10C connected to TOR 10B) as a vESI to PE 6A. In this way, MAC addresses are learned behind the vESI, which is advertised with the corresponding TOR-ESI values. In another example, the addition of a TOR-ESI value of a vESI may be conditioned upon MAC count per ESI. For instance, the addition of a TOR-ESI value may be conditioned to occur when the number of MAC addresses tied to an Ethernet segment goes beyond a specific number.

At a later time, PE 6B may determine that a network failure has occurred with respect to ES 12B. For instance, ES 12B that connects to CE 8B may fail, or CE 8B may fail, rendering MAC addresses behind CE 8B unreachable. If, for example, a route along Ethernet segment 12B failed, TOR 10B may send PE 6B an Ethernet route withdrawal advertisement. PE 6B may update the vESI by removing the TOR-ESI value associated with the unreachable Ethernet segment (e.g., ES 12B) from the vESI, without deleting the other TOR-ESI values in the vESI. In this way, PE 6B may perform mass MAC route withdrawal pertaining to the unreachable Ethernet segment 12B and all the associated MAC addresses, without withdrawing the other MAC addresses reachable by Ethernet segment 12C. For example, when PE 6B is instructed to withdraw the TOR-ESI value associated with ES 12B, the vESI is updated to remove the TOR-ESI value associated with ES 12B from the vESI. In this way, all the MAC addresses associated with the unreachable Ethernet segment are withdrawn and the MAC addresses associated with the other Ethernet segments are left alone.

Moreover, because the updated vESI is advertised from PE 6B to PE 6A as an aggregation of TOR-ESI values over the EVPN network, PE 6A (and TOR 10A) may also withdraw all MAC routes associated with a specific TOR-ESI value that was removed from the vESI, thus enabling mass MAC route withdrawal on PE 6A (and TOR 10A). In particular, PE 6B may advertise an updated vESI without the TOR-ESI value associated with ES 12B. PE 6A may then remove MAC routes having the TOR-ESI values that are associated with ES 12B. In this way, mass MAC route withdrawal for EVPN DCI can be achieved.

In another example, the techniques described herein may be used to detect core-isolation and to trigger mass MAC route withdrawal. When Core isolation (e.g., when PE network device loses BGP connectivity to TOR switch) towards VXLAN EVI on PE 6B occurs, the TOR-ESI values on the VXLAN EVI will be deleted. This enables PE 6B to delete all members of the vESI. The vESI may also be withdrawn from the upstream PE network device, e.g., PE 6A. On receiving the vESI withdraw, PE 6A may delete all MAC routes that are tied to the TOR-ESI values of the vESI, thereby enabling mass MAC route withdrawal.

Figure 2:
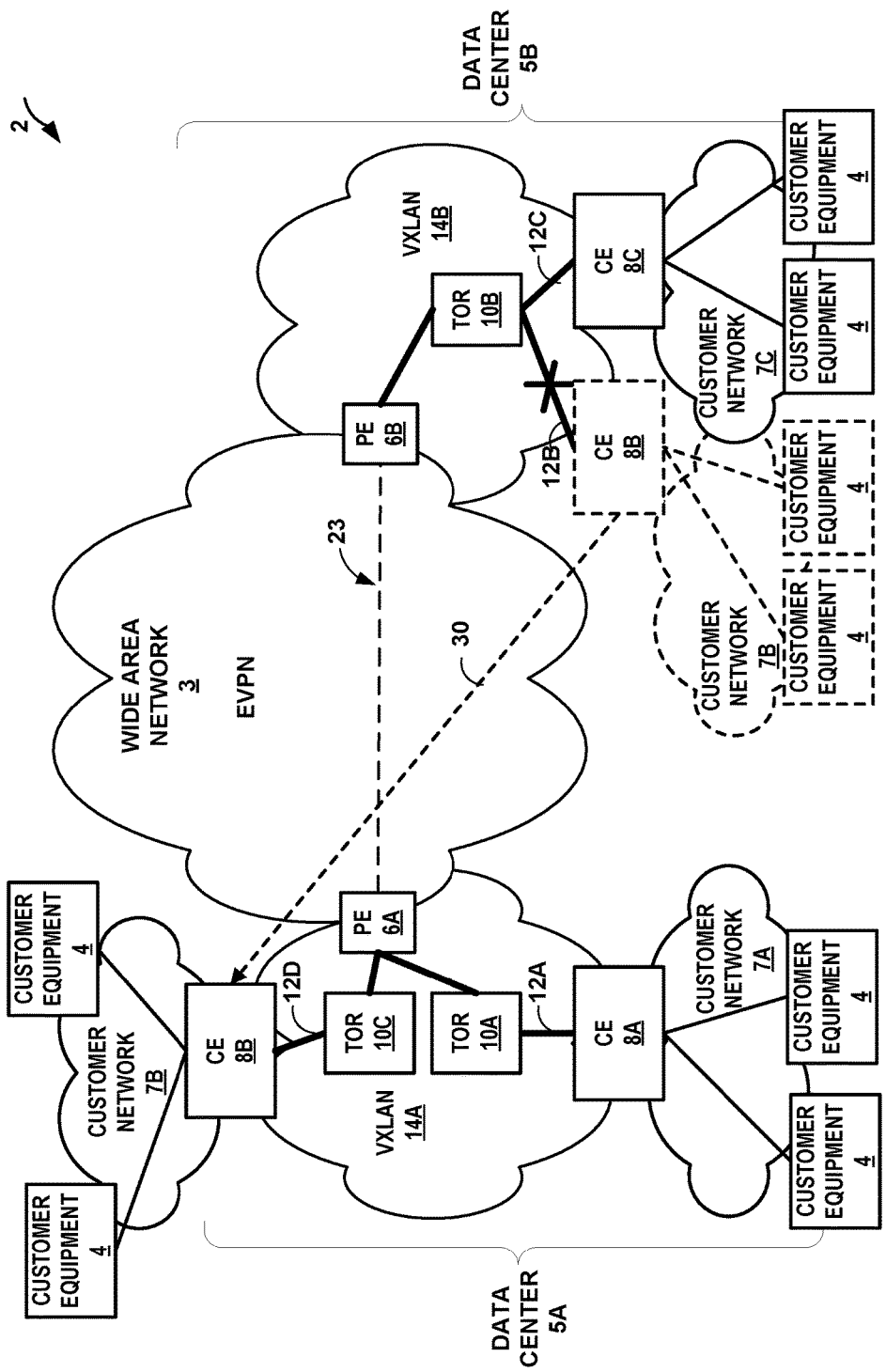
FIG. 2 is a block diagram illustrating an example MAC address move in accordance with the techniques of the disclosure.

FIG. 2 is a block diagram illustrating an example MAC address move, in accordance with the techniques of the disclosure. In general, the components illustrated in FIG. 2 operate in substantially the same manner as described with respect to FIG. 1. In the example of FIG. 2, a network event, such as a MAC address move 30, has occurred within the underlying transport network within data center 5B so as to prevent communication between data center-facing port(s) of PE 6B and CE router 8B via overlay VXLAN 14B. Under conventional systems, when CE 8B (and/or MAC addresses behind CE 8B) is moved from TOR 10B within data center 5B to TOR 10C within data center 5A, packets from PE 6A destined for MAC addresses behind CE 8B are still forwarded to PE 6B because the MAC route still points to MAC addresses originally connected to Ethernet segment (ES) 12B. Because the MAC addresses have moved and ES 12B is unavailable, the traffic will not reach TOR 10C or CE 8B until all of the old MAC routes are deleted from TOR 10A.

In accordance to the techniques of this disclosure, when CE 8B is moved from TOR 10B within data center 5B to TOR 10C within data center 5A, only the TOR-ESI of ES 12B associated with CE 12B is withdrawn from the vESI. This will result in PE 6A deleting all MAC routes that are associated with ES 12B by sending a withdraw request for the TOR-ESI value of ES 12B. Based on the techniques of this disclosure, TOR 10A deletes all MAC routes to MAC addresses learned behind ES 12B. In this way, packets going from CE 8A to MAC addresses behind ES 12B will not have a MAC route and enables TOR 10C to begin MAC address learning earlier with usual broadcast, unknown unicast, and multicast (BUM) procedures.

Figure 3:
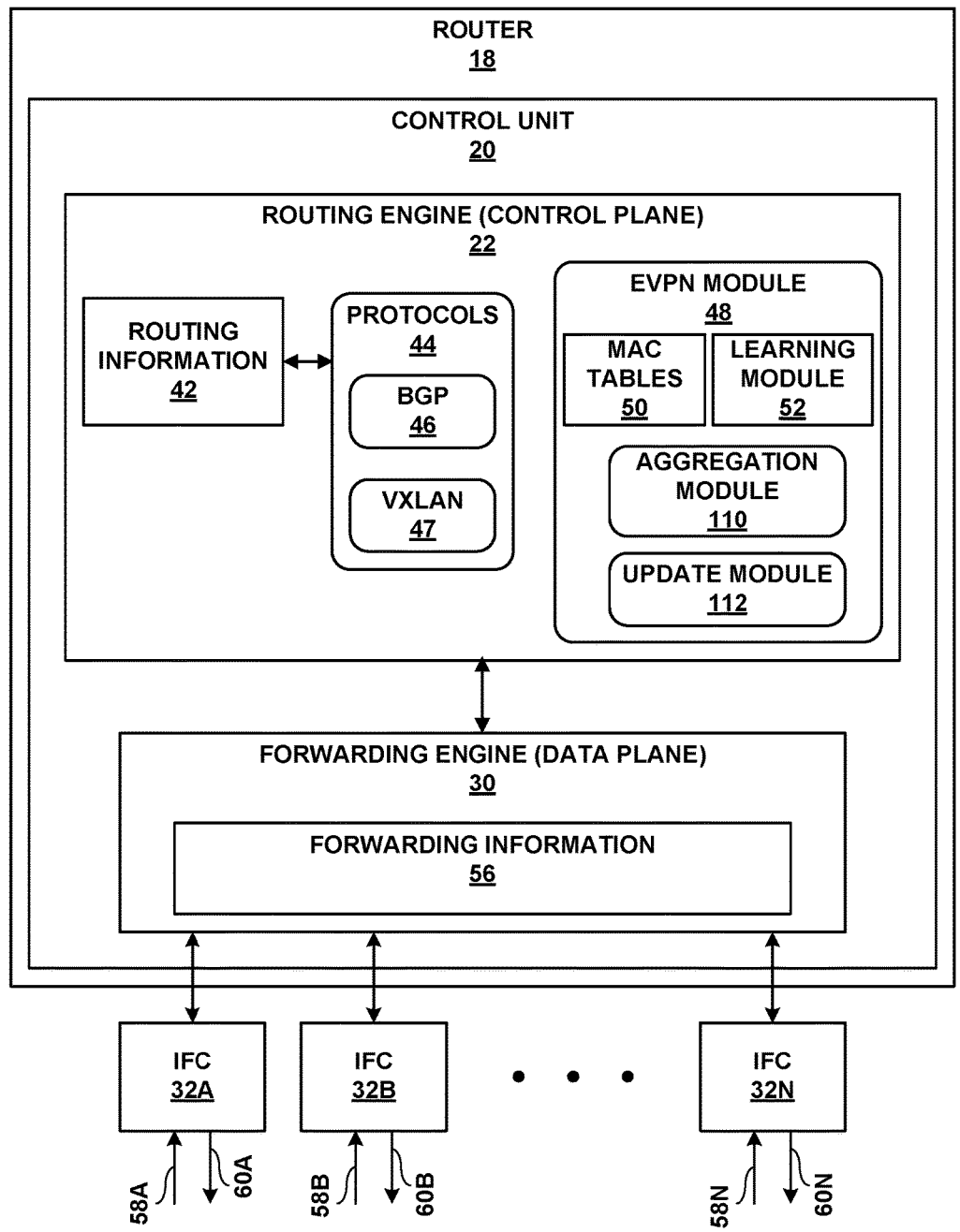
FIG. 3 is a block diagram illustrating an example provider edge (PE) network device of FIG. 1 and FIG. 2 in greater detail, in accordance with techniques of the disclosure.

FIG. 3 is a block diagram illustrating an example PE network device of FIG. 1 in greater detail, in accordance with techniques of the disclosure. Router 18 may represent each of PEs 6 of FIG. 1 and FIG. 2. By way of example, router 18 is explained with reference to PE 6B of FIG. 1. Router 18 includes a control unit 20 that includes a routing engine 22 coupled to a forwarding engine 30. Router 18 includes interface cards 32A-32N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Routing engine 22 provides an operating environment for various protocols 44 that execute at different layers of a network stack. Routing engine 22 is responsible for the maintenance of routing information 42 to reflect the current topology of a network and other network entities to which router 18 is connected. In particular, routing protocols periodically update routing information 42 to accurately reflect the topology of the network and other entities based on routing protocol messages received by router 18. The protocols may be software processes executing on one or more processors. For example, routing engine 22 includes network protocols that operate at a network layer of the network stack. In the example of FIG. 3, network protocols include the Border Gateway Protocol (BGP) 46, which is a routing protocol. Routing engine 22 also executes Virtual Extensible LAN (VXLAN) protocol 47, which operates to configure and support VXLANs (e.g., VXLANs 14) within the network in which router 18 resides. Routing engine 22 may include other protocols not shown in FIG. 3.

Routing engine 22 may also include an EVPN module 48 having MAC tables 50, learning module 52, aggregation module 110, and update module 112. EVPN module 48 executes in the control plane of router 18 and performs MAC address learning to automatically update portions of routing information 42 for each EVI established by router 18. EVPN module 48 is invoked when router 18 receives data packets. EVPN module 48 performs MAC address learning using learning module 52 and updates the MAC tables 50 to initially record source MAC addresses of the EVPN customer devices from which the data packets were received and the associations between the Ethernet segments connected to router 18. For example, the MAC tables 50 record MAC addresses that identify the source customer devices (e.g., customer equipment 4 of customer network 7B) of the data packets transmitted over the VXLAN 14B. In accordance with the techniques of the disclosure, router 18, such as PE 6B, also learns and stores Top-of-Rack Ethernet segment identifiers (TOR-ESIs) values identifying the Ethernet segments connected to a TOR switch (e.g., ES 12B and ES 12C connected to TOR 10B). Router 18 may associate MAC addresses learned from the Ethernet segments ES 12B and ES 12C with the TOR-ESI values of the Ethernet segments, much as an L2 switch learns associations between MAC addresses and ports.

EVPN module 48 may include an aggregation module 110 configured to aggregate the TOR-ESI values into a vESI. In one example, aggregation module 110 may aggregate respective TOR-ESI values that represent Ethernet segments 12B and 12C to form an aggregation of TOR-ESI values to be advertised as a vESI. This aggregation may be stored in MAC tables 50.

Learning module 52 may learn the MAC addresses associated with customer equipment 4 of Ethernet segment 12B and associate the learned MAC addresses with connected TOR switch 10B. Learning module 52 may also learn the MAC addresses of customer equipment 4 of Ethernet segment 12C and associate the learned MAC addresses with connected TOR switch 10B. When implementing an EVPN DCI, control plane L2 MAC learning may learn the TOR-ESIs by exchanging with remote PE devices BGP messages containing a vESI with an aggregation of these TOR-ESI values. This enables router 18 to advertise an aggregated set of TOR-ESI values as members of a vESI that is further communicated to upstream PEs, such as PE 6A, through WAN 3.

Router 18 may be instructed to withdraw one of the Ethernet segments (e.g., ES 12B or ES 12C) in the EVPN DCI instance that has experienced a network failure. In accordance with techniques of the disclosure, EVPN module 48 may include an update module 112 that updates the vESI advertised to interconnected PE routers, such as PE 6A. When TOR 10B requests router 18 to withdraw the TOR-ESI value of ES 12B from the vESI, MAC routes associated with the TOR-ESI value are removed from routing tables included in router 18. Update module 112 of router 18 may also trigger the aggregation module 110 to remove only the failed Ethernet segment from the aggregate TOR-ESI values. In one example, when Ethernet segment (ES) 12B goes down, router 18 may receive a withdrawal request from one of the inbound links 58. Update module 112 may trigger the withdrawal of all the MAC routess associated with ES 12B alone. For example, update module 112 may remove MAC routes from MAC tables 50 included in router 18, where the MAC routes have the TOR-ESI values of ES 12B. Update module 112 also provides a trigger to aggregation module 110 to update the values from vESI stored within the MAC tables 50 by removing the TOR-ESI value associated with ES 12B from the vESI.

Router 18 may then advertise the updated vESI to upstream PE routers, e.g., PE 6A, without the TOR-ESI value associated with ES 12B. In this way, PE 6A, which may also be represented by an upstream PE network device similar to router 18, may also withdraw only the MAC routes associated with the failed link, e.g., ES 12B, by removing the TOR-ESI value of ES 12B from the aggregation of TOR-ESI values, thus enabling mass MAC route withdrawal. More particularly, only MAC routes to MAC addresses coupled to ES 12B are removed from the routing tables because these MAC routes have the corresponding TOR-ESI value that was withdrawn from the virtual ESI (vESI).

Forwarding engine 30 represents hardware and logic functions that provide high-speed forwarding of network traffic. Forwarding engines 30 typically includes a set of one or more forwarding chips programmed with forwarding information that maps network destinations with specific next hops and the corresponding output interface ports. In the example of FIG. 3, forwarding engine 30 includes forwarding information 56. In accordance with routing information 42, forwarding engine 30 maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

The architecture of router 18 illustrated in FIG. 3 is shown for exemplary purposes only. The disclosure is not limited to this architecture. In other embodiments, router 18 may be configured in a variety of ways. In one embodiment, for example, some of the functionality of routing engine 22 and forwarding engine 30 may be distributed within IFCs 32.

Elements of control unit 20 may be implemented solely in software, or hardware, or may be implemented as combinations of software, hardware, or firmware. For example, control unit 20 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 18, e.g., protocols. Control unit 20, in some examples, retrieves and executes the instructions from memory for these aspects.

FIG. 4 is a flowchart illustrating example operations of network devices to provide mass MAC withdrawal for an EVPN DCI that utilizes vESIs, in accordance with techniques of the disclosure. Example operations in accordance with the techniques of the disclosure are illustrated for example purposes with respect to PE 6A, PE 6B.

As shown in FIG. 4, PE 6B may configure a virtual Ethernet segment identifier (vESI) that includes a plurality of top-of-rack Ethernet segment identifier (TOR-ESI) values that represent a plurality of Ethernet segments coupled to a top-of-rack (TOR) switch in a data center network (301). Each of the plurality of Ethernet segments, such as ES 12B and 12C, comprises one or more MAC addresses associated with the Ethernet segments. For example, learning module 52 of router 18 may learn MAC addresses of customer equipment 4 of customer network 7B. Learning module 52 may associate the MAC addresses with a respective TOR-ESI value that represents each of the connected Ethernet segments (e.g., ES 12B and ES 12C) connected to TOR 10B.

The aggregation module 110 of PE 6B may be configured to aggregate the plurality of TOR-ESI values that represent the Ethernet segments coupled to the TOR switch to form an aggregation of the TOR-ESI values, which may be represented as a virtual ESI (vESI). PE 6B may configure the vESI to be anchored on an interconnecting ESI (I-ESI) at PE 6B that represents the links between a EVPN network over which the EVPN DCI is implemented (e.g., WAN 3) and a data center (e.g., 5B).

PE 6B may then advertise the vESI that includes the aggregation of TOR-ESI values through WAN 3 to an interconnecting PE network device, such as PE 6A (302). In one example, PE 6B may advertise a vESI that includes TOR-ESI values representing ES 12B and ES 12C.

PE 6A may receive the advertised vESI from PE 6B through the WAN 3 network (303). For example, PE 6A may receive the vESI from PE 6B that includes an aggregation of TOR-ESI values associated with ES 12B and ES 12C that are connected to TOR 10B. PE 6A may then learn MAC addresses having TOR-ESI values (304). In this way, MAC addresses are learned behind the vESI, which is advertised with the corresponding TOR-ESI values.

At a later time, a TOR switch may detect that one of the plurality of Ethernet segments coupled to the TOR switch is unreachable. For instance, network link Ethernet segments 12B or 12C may fail, or CEs 8B or 8C may fail. In any case, TOR 10B may determine the link failure has occurred. In one example, when a failure occurs on Ethernet segment 12B, TOR 10B may determine that Ethernet segments 12B and its associated MAC addresses are unreachable. PE 6B may receive a withdraw request from TOR 10B to withdraw the TOR-ESI value that represents an unreachable one of the Ethernet segments from the TOR-ESI values in the vESI (305). In one example, when Ethernet segment (ES) 12B goes down, PE 6B may receive a withdrawal request from TOR 10B to withdraw the TOR-ESI value that represents ES 12B. Update module 112 of PE 6B may trigger the withdrawal of all the MAC routes associated with ES 12B alone. For example, update module 112 provides a mechanism to trigger aggregation module 110 to update the vESI by removing the TOR-ESI value associated with ES 12B from the vESI.

PE 6B may then remove one of the plurality of TOR-ESI values from the vESI to form an updated vESI (306). This includes removing MAC routes from a routing table included in PE network device, where the MAC routes have the TOR-ESI values of the unreachable one of the plurality of Ethernet segments. In other words, the corresponding MAC addresses of the unreachable Ethernet segment alone may be withdrawn. For example, if ES 12B alone goes down, update module 112 triggers the removal of MAC routes having the TOR-ESI value associated with ES 12B from MAC tables 50. Update module 112 may also trigger aggregation module 110 to remove the corresponding TOR-ESI value from the aggregated plurality of TOR-ESI values in the vESI to form an updated vESI absent of ES 12B. PE 6B may further advertise the updated vESI without the TOR-ESI value associated with ES 12B to another PE router (e.g., PE 6A) through the WAN 3 (307).

PE 6A may receive the updated vESI without ES 12B, which represents the unreachable Ethernet segment coupled to the TOR 10B (308). PE 6A may then remove MAC routes having the TOR-ESI value that represents the unreachable Ethernet segment (e.g., ES 12B) based on the updated vESI (309). In this way, PE 6A may also withdraw only the MAC routes associated with the failed link, e.g., ES 12B, by removing the MAC routes having the TOR-ESI value associated with ES 12B, thus enabling mass MAC route withdrawal on the upstream network device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
   configuring, by a provider edge (PE) network device that implements an Ethernet virtual private network data center interconnect (EVPN DCI), a virtual Ethernet segment identifier (vESI) that comprises a plurality of top-of-rack Ethernet segment identifier (TOR-ESI) values that represent a plurality of Ethernet segments coupled to a top-of-rack (TOR) switch, wherein each of the plurality of Ethernet segments comprises one or more media access control (MAC) addresses associated with a respective one of the plurality of Ethernet segments;

advertising, by the PE network device and to another PE network device in the EVPN DCI, the vESI that comprises the plurality of TOR-ESI values;

receiving, by the PE network device and from the TOR switch, a withdraw request to withdraw one of the plurality of TOR-ESI values that represents an unreachable one of the plurality of Ethernet segments coupled to the TOR switch; and removing, by the PE network device, the one of the plurality of TOR-ESI values from the vESI to form an updated vESI, wherein deleting the one of the plurality of TOR-ESI values from the vESI further comprises removing MAC routes having the one of the plurality of TOR-ESI values that represents the unreachable one of the plurality of Ethernet segments coupled to the TOR switch.

2. The method of claim 1, wherein configuring the vESI comprises aggregating the plurality of TOR-ESI values that represent the plurality of Ethernet segments coupled to the TOR switch to form an aggregation of the plurality of TOR-ESI values.

3. The method of claim 1, wherein configuring the vESI comprises:
configuring an interconnect ESI (I-ESI) at the PE network device that represents links between a wide area network (WAN) over which the EVPN DCI is implemented and a data center that includes the TOR switch; and
anchoring the vESI on the I-ESI at the PE network device.

4. The method of claim 1, further comprising:
advertising, by the PE network device and to the another PE network device in the EVPN DCI, the updated vESI.

5. The method of claim 1, wherein the unreachable one of the plurality of Ethernet segments coupled to the TOR switch is unreachable due to movement of the one or more MAC addresses associated with the unreachable one of the plurality of Ethernet segments, wherein the one or more MAC addresses are moved from the TOR switch to another TOR switch.

6. The method of claim 1, further comprising advertising the one or more MAC addresses learned from each of the plurality of Ethernet segments with the one of the plurality of TOR-ESI values of the respective one of the plurality of Ethernet segments.

7. The method of claim 1, wherein removing the MAC routes comprises removing the MAC routes from a routing table included in the PE network device, the MAC routes having the one of the plurality of TOR-ESI values that represents the unreachable one of the plurality of Ethernet segments and destinations of the one or more MAC addresses associated with the unreachable one of the plurality of Ethernet segments.

8. A method comprising:
receiving, by a provider edge (PE) network device and from another PE network device in an Ethernet virtual private network data center interconnect (EVPN DCI), a virtual Ethernet segment identifier (vESI) that comprises a plurality of top-of-rack Ethernet segment identifier (TOR-ESI) values that represent a plurality of Ethernet segments coupled to a top-of-rack (TOR) switch that is coupled to the another PE network device, wherein each of the plurality of Ethernet segments comprises one or more media access control (MAC) addresses associated with a respective one of the plurality of Ethernet segments;

learning, by the PE network device, the one or more MAC addresses associated with each of the plurality of Ethernet segments, wherein the one or more MAC addresses are advertised with one of the plurality of TOR-ESI values that represents the respective one of the plurality of Ethernet segments;

receiving, by the PE network device and from the another PE network device, an updated vESI, wherein an unreachable one of the plurality of Ethernet segments coupled to the TOR switch is absent from the updated vESI; and removing, by the PE network device, MAC routes having the one of the plurality of TOR-ESI values that represents the unreachable one of the plurality of Ethernet segments based on the updated vESI.

9. The method of claim 8, wherein removing the MAC routes comprises removing the MAC routes from a routing table included in the PE network device, the MAC routes having the one of the plurality of TOR-ESI values that represents the unreachable one of the plurality of Ethernet segments and destinations of the one or more MAC addresses associated with the unreachable one of the plurality of Ethernet segments.

10. A provider edge (PE) network device comprising:
a control unit having at least one processor coupled to memory, wherein the control unit executes software configured to establish an Ethernet virtual private network data center interconnect (EVPN DCI);
an interface that connects the PE network device to a top-of-rack (TOR) switch; and
a routing engine configured to:
configure a virtual Ethernet segment identifier (vESI) that comprises a plurality of top-of-rack Ethernet segment identifier (TOR-ESI) values that represent a plurality of Ethernet segments coupled to the TOR switch, wherein each of the plurality of Ethernet segments comprises one or more media access control (MAC) addresses associated with a respective one of the plurality of Ethernet segments;
advertise the vESI that comprises the plurality of TOR-ESI values to another PE network device in the EVPN DCI;
receive a withdraw request from the TOR switch to withdraw one of the plurality of TOR-ESI values that represents an unreachable one of the plurality of Ethernet segments coupled to the TOR switch; and
remove the one of the plurality of TOR-ESI values from the vESI to form an updated vESI, wherein the routing engine is configured to remove MAC routes having the one of the plurality of TOR-ESI values that represents the unreachable one of the plurality of Ethernet segments coupled to the TOR switch.

11. The PE network device of claim 10, wherein, to configure the vESI, the routing engine is configured to aggregate the plurality of TOR-ESI values that represent the plurality of Ethernet segments coupled to the TOR switch to form an aggregation of the plurality of TOR-ESI values.

12. The PE network device of claim 10, wherein, to configure the vESI, the routing engine is configured to:
configure an interconnect ESI (I-ESI) at the PE network device that represents links between a wide area network (WAN) over which the EVPN DCI is implemented and a data center that includes the TOR switch; and anchor the vESI on the I-ESI at the PE network device.

13. The PE network device of claim 10, wherein the routing engine is configured to advertise the updated vESI to the another PE network device in the EVPN DCI.

14. The PE network device of claim 10, wherein the unreachable one of the plurality of Ethernet segments coupled to the TOR switch is unreachable due to movement of the one or more MAC addresses associated with the unreachable one of the plurality of Ethernet segments, wherein the one or more MAC addresses are moved from the TOR switch to another TOR switch.

15. The PE network device of claim 10, wherein the routing engine is further configured to advertise the one or more MAC addresses learned from each of the plurality of Ethernet segments with the one of the plurality of TOR-ESI values of the respective one of the plurality of Ethernet segments.

16. The PE network device of claim 10, wherein, to remove the MAC routes, the routing engine is configured to remove the MAC routes from a routing table included in the PE network device, the MAC routes having the one of the plurality of TOR-ESI values that represents the unreachable one of the plurality of Ethernet segments and destinations of the one or more MAC addresses associated with the unreachable one of the plurality of Ethernet segments.

17. A provider edge (PE) network device comprising:

a control unit having at least one processor coupled to memory, wherein the control unit executes software configured to establish an Ethernet virtual private network data center interconnect (EVPN DCI);

an interface that connects the PE network device to another PE network device in the EVPN DCI; and a routing engine configured to:

receive a virtual Ethernet segment identifier (vESI) from the another PE network device in the EVPN DCI, the vESI comprising a plurality of top-of-rack Ethernet segment identifier (TOR-ESI) values that represent a plurality of Ethernet segments coupled to a top-of-rack (TOR) switch that is coupled to the another PE network device, wherein each of the plurality of Ethernet segments comprises one or more media access control (MAC) addresses associated with a respective one of the plurality of Ethernet segments;

learn the one or more MAC addresses associated with each of the plurality of Ethernet segments, wherein the one or more MAC addresses are advertised with one of the plurality of TOR-ESI values that represents the respective one of the plurality of Ethernet segments;

receive an updated vESI from the another PE device, wherein an unreachable one of the plurality of Ethernet segments coupled to the TOR switch is absent from the updated vESI; and remove MAC routes having the one of the plurality of TOR-ESI values that represents the unreachable one of the plurality of Ethernet segments based on the updated vESI.

18. The PE network device of claim 17, wherein, to remove the MAC routes, the routing engine is configured to remove the MAC routes from a routing table included in the PE network device, the MAC routes having the one of the plurality of TOR-ESI values that represents the unreachable one of the plurality of Ethernet segments and destinations of the one or more MAC addresses associated with the unreachable one of the plurality of Ethernet segments.

* * * * *